April 1, 1952  A. P. SMITH  2,590,898
DRIVE MECHANISM FOR CIRCULAR SAWS
Filed Nov. 2, 1948  2 SHEETS—SHEET 1
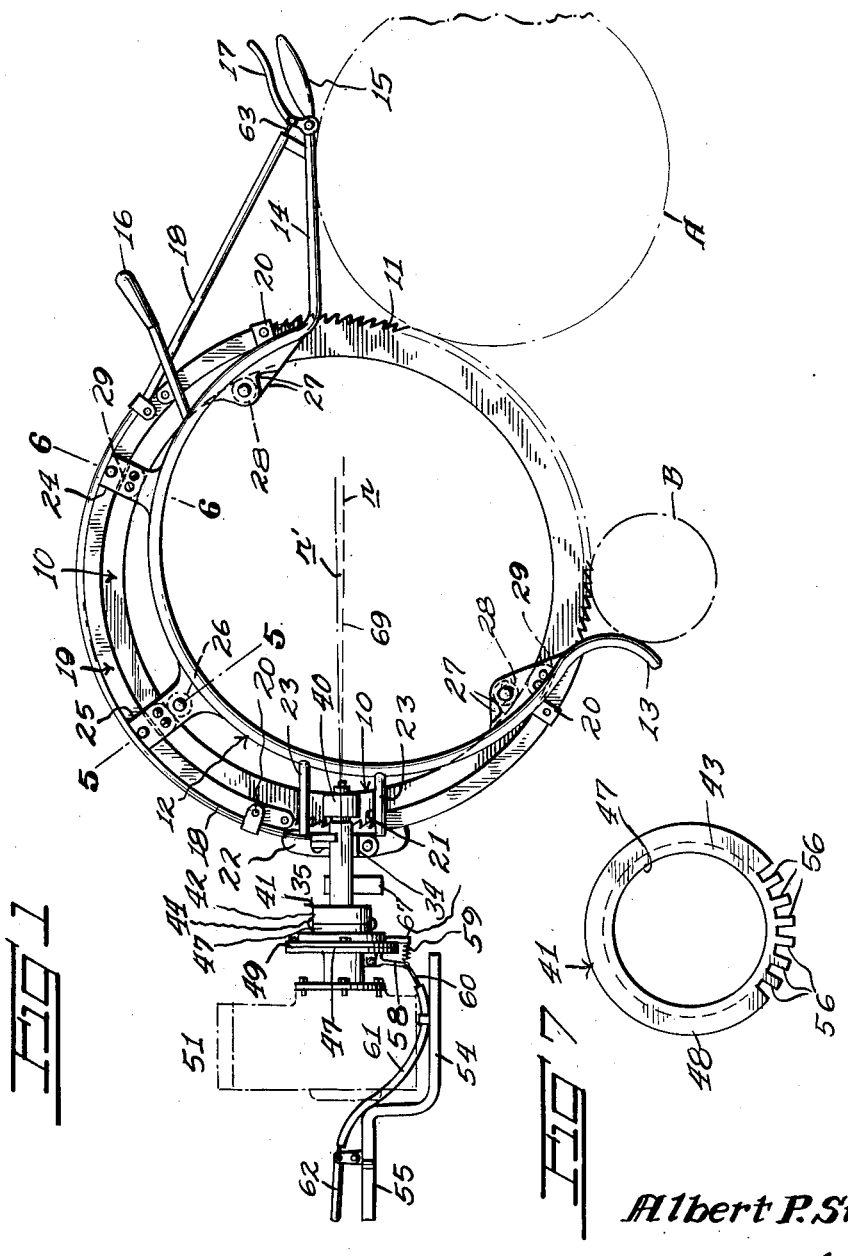
Inventor
Albert P. Smith
By Wilfred Lawson
ATTORNEY April 1, 1952     A. P. SMITH     2,590,898
DRIVE MECHANISM FOR CIRCULAR SAWS
Filed Nov. 2, 1948     2 SHEETS—SHEET 2
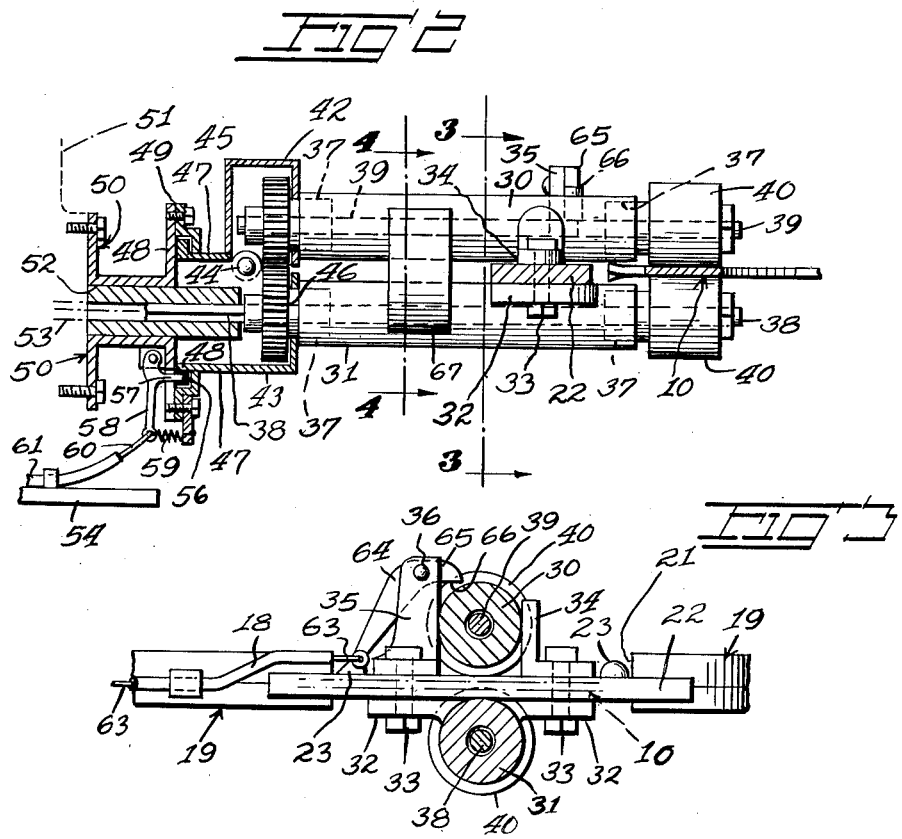
Inventor
Albert P. Smith
By Wilfred E. Lawson
ATTORNEY Patented Apr. 1, 1952

2,590,898

UNITED STATES PATENT OFFICE 2,590,898

DRIVE MECHANISM FOR CIRCULAR SAWS

Albert P. Smith, Ava, Mo., assignor, by mesne assignments, to Barker Saw Company, Springfield, Mo., a corporation of Missouri Original application July 9, 1945, Serial No. 603,771. Divided and this application November 2, 1948, Serial No. 57,844

6 Claims. (Cl. 74—206)

This invention relates to the class of saws and pertains particularly to an improved type of circular saw which is designed to be held in the hands for use and the present application is a division of application Serial No. 603,771, filed July 9, 1945, now Patent No. 2,572,065, June 19, 1951.

A particular object of the present invention is to provide a novel power transmitting mechanism which is designed for the purpose of transmitting driving power from a power source to a rotary, annular saw and for effecting the smooth and easy application of such power to the saw and interrupting the application of power to the same, without stopping the power generating mechanism.

Another object of the invention is to provide a power transmitting mechanism of novel construction, designed primarily for driving a rotary annular saw, which is designed so that it may be held in the hands of the saw operator and the operator may be able to transmit desired driving power to the saw or interrupt the same merely by the shifting of one of two opposing driving elements between which the saw is disposed.

Another object of the invention is to provide a power transmitting mechanism for a circular saw structure wherein the driving connection between the saw and a source of power includes a pair of opposed friction rollers between which the saw is positioned, with means for moving said rollers relative to the interposed saw so that the driving connection between the rollers and the saw may be regulated as desired.

Other objects and advantages of the invention will become apparent as the description of the same proceeds and the invention will be best understood from a consideration of the following detailed description taken in connection with the accompanying drawings forming a part of the specification, with the understanding, however, that the invention is not confined to a strict conformity with the showing of the drawings but may be changed or modified so long as such changes or modifications mark no material departure from the salient features of the invention as expressed in the appended claims.

In the drawings:

Figure 1 is a view in side elevation of a saw constructed in accordance with the present invention and illustrating the use of the same.

Figure 2 is a view in bottom plan of the driving mechanism, the gear housing and casting by which the housing is coupled to the driving motor, being in horizontal section.

Figure 3 is a sectional view taken on the line 3—3 of Figure 2.

Figure 4 is a sectional view taken on the line 4—4 of Figure 2.

Figure 5 is a sectional view taken substantially on the line 5—5 of Figure 1.

Figure 6 is a sectional view taken substantially on the line 6—6 of Figure 1.

Figure 7 is a view illustrating the toothed flange of the gear housing.

Referring now more particularly to the drawings wherein like numerals of reference designate corresponding parts throughout the several views, the numeral 10 designates the saw which is illustrated as being in the form of a ring or annulus and having the teeth 11 around the outer periphery thereof.

In the illustration of the structure as presented in Figure 1, the saw is shown in position for cutting into a large log A and illustrating the use of the hereinafter described bracing arm.

The numeral 12 designates the frame of the machine which is preferably formed of suitable tubular material and is of little more than semicircular form, terminating at one end in the outwardly curving bracing foot or foot piece 13 and at the opposite end being extended laterally to provide a brace 14 which terminates in a handle or hand grip 15. An additional hand grip 16 is connected with the frame above the brace foot 14 to facilitate handling the device.

Pivotally attached to the hand grip 15 is the control lever 17 and extending from a position at one side of this control lever is a tubular guide 18 which passes around the outer edge of the saw guard generally designated 19. The purpose of the tubular guide 18 will be hereinafter set forth.

The saw guard 19 is of divided or slotted form to receive the toothed edge of the saw 10 and, like the frame 12, it is in the form of an open or broken ring, having its end or terminal portions connected with the ends of the frame 12 by the bracket pieces 20. The saw guard 19 is of greater diameter than the frame 12 as shown and the free ends of the guard come into position for attachment to the ends of the frame 12, upon the outer side of the frame.

Upon the side of the frame 12 nearest the brace foot 13 the circular guard band 19 has a break 21 in the side portions through a short extent of such side portions, which is bridged by the bracket plate 22 which projects radially outwardly and is curved to substantially conform to the curvature of the guard.

Upon opposite sides of the break 21 brace arms 23 connect the guard 19 with the frame 12.

In addition to the connecting pieces 20 between the frame 12 and the guard, a pair of brackets 24 is secured to the frame adjacent to the brace 14 and this pair of brackets extends radially outwardly and has secured between the outer ends, the guard 19. The saw 10 thus passes between these brackets. See Figure 6.

At substantially midway between the ends of the frame 12 and the guard 19 a second pair of brackets 25, is secured to the frame 12 and extends radially outwardly and between the two brackets making up this pair, which correspond with the pair of brackets 24, the guard 19 is secured and the saw 10 passes. However, this pair of brackets 25 support between them a roller 26, across the periphery of which the inner edge of the saw 10 passes. See Figure 5.

Adjacent to each end of the circular portion of the frame 12, the frame has secured thereto a pair of inwardly extending wings 27 between which is rotatably supported a roller 28. These rollers are also upon the inner side of the annular saw body 10 and the inner edge of such saw body contacts the peripheries thereof so that the saw is rotatably supported upon the roller 26 and the rollers 28.

As shown the rollers 28 are on a line across the frame which is removed from the radial center of the saw and the saw guard 19 upon the side of such center away from the roller 26. Thus any tendency for the saw 10 to move away from the roller 26 is effectively prevented.

Upon the inner sides of the webs 27 and upon the inner sides of the plates 24 and 25 making up each of the pairs, are secured guide blocks 29 which contact the side faces of the saw and maintain the same centered in the guard 19 so that the teeth will not come in contact with the side parts of the guard.

The bracket plate 22 is located between two tubular housings 30 and 31, the housing 31 carrying the oppositely directed attaching ears 32 which are secured to the bracket plate 22 by the bolts 33. See Figures 2 and 3.

Opposite from the lower ear 32 there is secured to the remote side of the plate 22, the angle supporting bracket 34 which is held in place by the adjacent bolt 33, while the other bolt 33 secures in place upon the same side of the plate 22 as the bracket 34, the outwardly extending bearing ears 35 between which extends a pivot pin 36. The tubular housing 30 lies between the bracket 34 and the bearing ear 35 and rests upon the bracket and is adapted to have movement relative to the housing 31.

In each end of each tubular housing is a bearing assembly 37 and extending through the tubular housing 31 and the two bearing assemblies therein, is the shaft 38 while a corresponding shaft 39 passes through the housing 30 and the two bearing assemblies therein.

As shown in Figure 3, the tubular housings 30 and 31 are supported upon the plate 22 so that their inner ends lie adjacent to the break 21 in the circular guard band and there is supported upon the inner end of each of the shafts 38 and 39, a friction roller 40 of suitable material, preferably fiber, the peripheral face of which is adapted to frictionally engage the adjacent side face of the saw 10.

At the outer ends of the tubular housings 30 and 31, is a gear housing which is generally designated 41 and which is made up of two sections 42 and 43 which are pivotally coupled together as indicated at 44 so that they may have slight oscillatory motion relative to one another and on an axis perpendicular to the shafts 38 and 39 and lying in a plane passing midway between such shafts.

Within the housing 41 are the two gears 45 and 46 which are mounted respectively upon the shafts 39 and 38. The housing sections 42 and 43 are joined to the adjacent tubular housings 30 and 31 respectively and it will thus be seen that if the inner ends of the tubular housing are pressed together or are forced apart slight rocking motion will be permitted between the gears while they remain in operative connection one with another.

The portions 42 and 43 of the gear housing 41 have similar or complementary outwardly extending substantially semi-circular portions 47 which are flanged as indicated at 48 to form a collar of circular form. This collar is engaged under a flanged securing ring 49 which is bolted or otherwise secured to a circular casting 50 which is designed for attachment to a motor which is shown in dotted outline and designated 51.

The central part of the casting 50 is in the form of a hub 52 through which may be extended a portion of the driving shaft 53 of the motor which may be formed to receive and have driving connection with the outer end of the shaft 38.

The numeral 54 designates a support upon which the motor is secured and integral with this support is a handle bar or hand grip 55. See Figure 1.

It will be apparent from the foregoing that the circular collar formed of the flange portions 48 and engaged in the locking ring 49 permits of relative turning movement between the motor and the saw structure.

In order to permit of the turning movement between the motor and saw and the securing of these two parts in adjusted relation, one of the flange portions 48 is provided with suitable notches 56, (Figure 7) in which may be selectively engaged the locking pawl 57, (Figure 2) which is carried by the lock lever 58 pivotally mounted upon the casting 50 as shown. A spring 59 connects the outer end of the lever 58 with an adjacent part of the casting and normally urges oscillation of the lever in a direction to engage the pawl in a locking or keeper notch 56.

Actuation of the locking lever 58 to permit the turning of the saw is accomplished by means of the control wire or cable 60 which is carried through a suitable guide 61 to the outer end of the handle bar 55 where it attaches to a control or hand grip lever 62. See Figure 1.

Sufficient play is allowed between the flanges 48 and the control or securing ring 49 to allow for the relative pivoting movement of the gear housing parts 42 and 43 to permit the necessary closing together of the friction wheels 40 against opposite sides of the saw. It will be readily appreciated that since only a very small fraction of an inch of movement of the friction rollers together is necessary to cause them to firmly bind the saw body 10 between them the amount of play between the gear housing portions need only be very small.

In order to effect the desired movement of the tubular housing 30 toward the housing 31 so as to bring the friction rollers into the desired contact with the adjacent faces of the saw, there is provided an operating or control cable or wire 63 which is attached at one end to the lever 17 and passed through the tubular guide 18, which extends around the top of the saw guard 19 to a point adjacent to the bearing ears 35. The wire 63 issues from the guide 18 at the bearing ears 35 and is attached to one end of a bell crank lever 64 which is pivotally mounted upon the pivot pin 36 and which has its other end extended part way across the adjacent movable tubular housing 30. See Figure 3. This housing 30 adjacent to the thrust applying tip 65 of the bell crank lever 64, is provided with a suitable bearing in the form of an outstanding lug 66 against which the tip or point 65 of the operating bell crank lever is adapted to engage.

The tubular housing 30 is normally urged away from the housing 31 by the substantially U-shaped expansion spring 67 (Figures 2 and 4) which has the legs adjacent to the free ends thereof curved oppositely to form the outwardly directed concave seats 68 in each of which an inner side of a tubular housing engages when the such ends of the spring are inserted between the housings as illustrated in Figures 2 and 4, between the gear housing 41 and the bracket plate 22. Thus it will readily be seen that so long as the control lever 17 is released the spring 67 will function to release the driving connection between the friction rollers 40 and the saw.

From the foregoing it will be readily apparent that there has been provided in the present device, a sawing machine which may be easily held in position while performing a sawing operation upon a tree, log or other body of timber.

In order that the saw may be firmly held against the rollers 26 and 28 the center line of the pair of tubular housings is angled slightly with respect to the radius of the saw designated $r$ so that such center line passes below the radial center $r$ of the saw as indicated by the broken line 69.

Figure 1 illustrates the manner of employing the frame arm for supporting the saw structure in initial working position for cutting into the large log A. Where the saw is used for cutting smaller logs such as the log B, the foot piece 13 will be rested against the side of the log so as to guide the saw downwardly through the log instead of horizontally as those guided by the use of the arm 14.

I claim:

1. Power transmitting mechanism of the character described, comprising two shafts in spaced, parallel relation, rigid means rotatably supporting one shaft, a gear housing having two parts, a pivotal coupling between said housing parts whereby one part has turning movement on an axis perpendicular to the shafts, one of said shafts having an end extending through a wall of and into one housing part, the other shaft having an end extending through a wall of and into the other housing part, meshed gears carried by the shafts in the housing, coacting friction rollers carried upon the other ends of the shafts, the said other shaft having swinging movement with the said other housing part about said axis for moving the rollers relative to one another, means for coupling a source of driving power with the said one shaft, yielding means urging movement of the said other shaft away from the first shaft to separate the rollers, and means for moving the said other shaft against the action of said yielding means.

2. Mechanism for transmitting power to a movably supported flat body, comprising two shafts in spaced, parallel relation, rigid means rotatably supporting one shaft adjacent to said movable body, a gear housing having two parts, a pivotal coupling between said parts whereby one part has turning movement on an axis perpendicular to the shafts, one of said shafts having an end extending through a wall of and into one housing part, the other shaft having an end extending through a wall of and into the other housing part, the other housing part having a circular extension concentric with the said one shaft and terminating in a surrounding annular flange, means engaging said flange for supporting the housing for turning movement as a unit about the axis of the said one shaft, meshed gears carried by the shafts in the housing, coacting friction rollers carried upon the other ends of the shafts and adapted to engage opposite sides of said movable body for transmitting movement to such body, the said other one of the shafts having swinging movement with the said one part of the housing about said axis for moving the rollers relative to one another, means for coupling a source of driving power with the said one shaft, resilient means interposed between the shafts and normally urging swinging movement of the said other shaft away from the first shaft to separate the rollers, and means for moving the said other shaft against the action of said resilient means.

3. Mechanism for driving a flat, annular rotary element, comprising means for rotatably supporting such element, a shaft rotatably mounted upon said supporting means, a driving roller carried upon one end of the shaft for driving contact with the element, a gear upon the other end of the shaft, a housing encasing the gear and having the shaft rotatably supported by and extending through a wall thereof, means for coupling a prime mover with the end of the shaft in the housing, said housing being in two parts, a pivot between said two parts whereby one part is movable relative to the other part, a second shaft in side by side parallel relation with the first shaft and having an end extended through and rotatably supported by a wall of the said other part of the housing, a gear upon the end of the second shaft within the housing and meshing with the first gear, a driving roller carried by the second shaft for driving contact with said element upon the opposite side thereof from the first roller, resilient means urging the second shaft and the said other part of the housing in a direction to separate the rollers, and means for urging movement of the rollers and shafts together.

4. A power transmitting mechanism for driving annular saws comprising a pair of shafts disposed in side by side relation, friction rollers on one end of each of the shafts for frictionally and drivingly engaging the sides of an annular saw between said rollers, gearing connecting the other ends of said shafts, means for rotatably journaling said shafts, said means including a housing having a pair of parts each receiving and rotatably journaling one of said shafts, said parts being pivotally connected for relative movement about an axis which extends transversely of the axes of said shafts and is inclined to the plane containing said axes, and means for causing rotation of said shafts and means for causing relative pivotal movement of said housing parts.

5. The combination of claim 4 including a housing enclosing each of said shafts, resilient means engaging said housings and yieldingly urging the latter apart.

6. The combination of claim 4 including a housing enclosing each of said shafts, resilient means engaging said housings and yieldingly urging the latter apart, means engaging said housings for urging the housings and the housing parts together.

ALBERT P. SMITH.

REFERENCES CITED

The following references are of record in the file of this patent:

UNITED STATES PATENTS

| Number | Name | Date |
| --- | --- | --- |
| 86,407 | Jenkins | Feb. 2, 1869 |
| 100,977 | Chamberlain | Mar. 22, 1870 |
| 983,016 | Barnes | Jan. 31, 1911 |
| 2,456,755 | Terrell | Dec. 21, 1948 |

FOREIGN PATENTS

| Number | Country | Date |
| --- | --- | --- |
| 13,969 | Great Britain | Oct. 2, 1916 |